Aug. 28, 1934.  J. C. CURTIS  1,971,772
ROCK DRILL LUBRICATOR
Filed Jan. 11, 1932

JOHN C. CURTIS
INVENTOR

BY
ATTORNEY

Patented Aug. 28, 1934

1,971,772

UNITED STATES PATENT OFFICE 1,971,772

ROCK DRILL LUBRICATOR

John C. Curtis, Cleveland, Ohio, assignor to The Cleveland Rock Drill Company, Cleveland, Ohio, a corporation of Ohio Application January 11, 1932, Serial No. 585,877

4 Claims. (Cl. 121—13)

This invention relates broadly to rock drills but is more particularly concerned with the lubrication thereof.

One object of this invention is to construct a rock drill with a rotation mechanism provided with efficient and positive lubricating device thus reducing to a minimum the wear of the movable pieces. In the general construction of rock drill, the rotation of the cutting tool is obtained by a rotation mechanism comprising a rifled stem engageable with a piston of complemental configuration. During the reciprocation of the piston and most generally during its rearward stroke, the rifled stem is made stationary and the piston following the rifle thereof, is urged to rotate and simultaneously transmit a consequential rotation of the cutting tool. Heretofore no means were provided to positively lubricate the rifle stem other than depending upon the lubricant mingled with the compressed air when introduced into the cylinder within which the rifled stem is mounted. It is obvious that the frictional resistance of the piston upon the stem is greatly increased by the torque applied to said piston and a positive lubricating device therefore was found necessary to reduce the pernicious effect of attrition.

Other objects more or less ancillary to the foregoing will appear in the following description which, considered in connection with the accompanying drawing, set forth the preferred embodiment of the invention.

Figure 1:
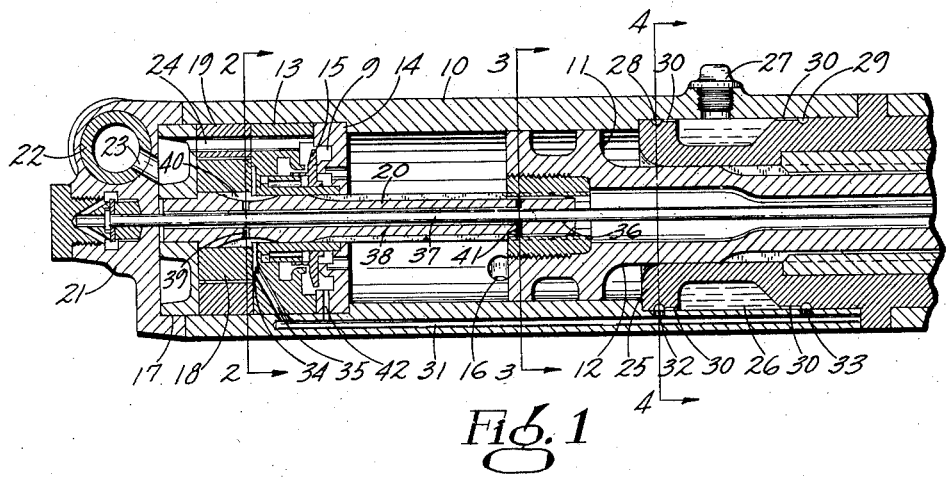
Fig. 1 is a longitudinal sectional view of a rock drill illustrating the invention.
Figures 2, 3:
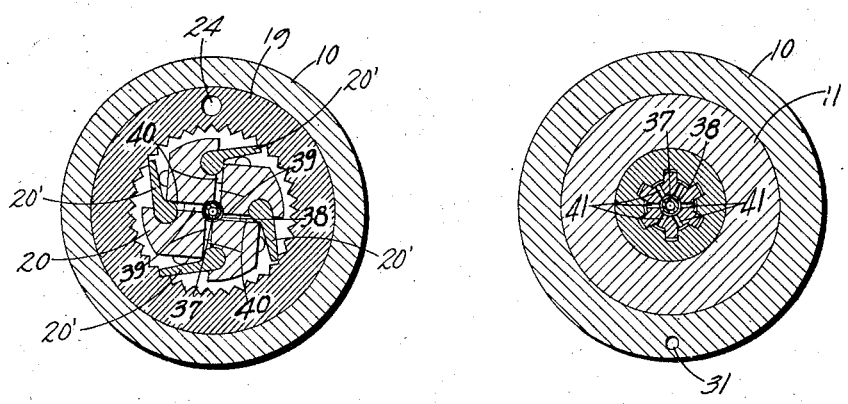
Fig. 2 is a transversal sectional view taken in a plane indicated by line 2—2 in Fig. 1.
Fig. 3 is a view similar to Fig. 2 but taken in a plane indicated by line 3—3 in Fig. 1.
Figure 4:
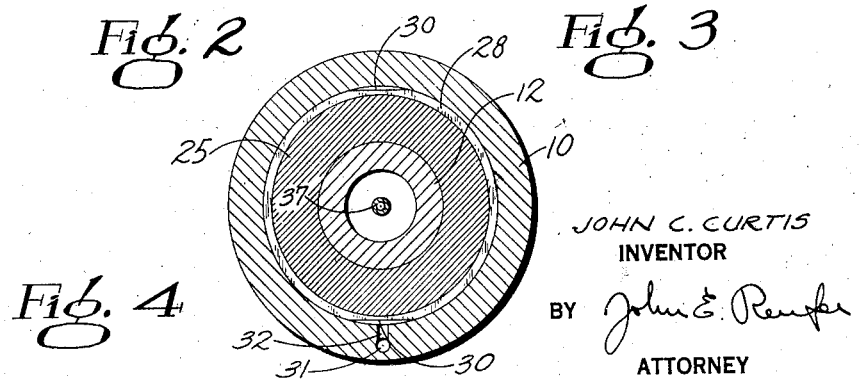
Fig. 4 is a view similar to Fig. 2 but taken in a plane indicated by line 4—4 in Fig. 1.

Referring to the drawing in which like symbols designate corresponding parts throughout the several views, 10 represents a cylinder having a piston 11 reciprocable therein and formed with a restricted portion or stem 12. Within the rear end of the cylinder 10 there is a valve block 13 mounted in abutting relation with a valve cap 14 which is cooperating with the valve block 13 to form an internal valve chamber 9 within which is reciprocably mounted a fluid pressure distributing valve 15. The movement of the valve 15 and the consequential reciprocative movement of the piston 11 are effected in a manner common to tools of this type and since the operation of this portion of the mechanism forms per se no part of the present invention no further description of these elements need be given here further than to direct attention to an orifice or exhaust port 16 in the cylinder 10 which is arranged in relation to the mean and extreme position of the piston strokes to afford communication between the cylinder and atmosphere during the operation of the piston.

Interposed between the valve block 13 and a bearing plate 17, there is a rotation mechanism 18 comprising a toothed ring 19 and a rotatable rifled stem or bar 20 connected to the ring by a plurality of spring pressed pawls 20'. The bar 20 is maintained within the head of the piston 11 in a bore of complemental configuration and with its appurtenances effectuate the rotative movement of the piston and in turn the cutting tool or drill during the reciprocation of the piston.

Mounted in abutting relation with the bearing plate 17 and maintained thereagainst by a pair of side bolts (not shown) there is a back-head 21 provided with a throttle valve 22 for controlling the admission of pressure fluid to the mechanism through a plurality of ports 23 and 24.

Toward the forward end of the cylinder 10, the piston stem 12 is slidably mounted within a stationary bushing 25 disposed in pressed fit engagement within the cylinder 10. This bushing is provided intermediate its ends with an enlarged circumferential recess 26 forming a lubricant reservoir which can be filled by removing a screw threaded plug 27. On each side of the reservoir 26 the bushing 25 is provided with two circumferentially disposed recesses 28 and 29 which are in constant registration with the reservoir 26 by a plurality of restricted openings 30 constituted by flat portions provided on the circumferential wall of the bushing 25. It will be noticed that the openings 30 extend only inwardly of the recesses 28 and 29 thus affording, outwardly of said recesses, a lubricant tight engagement of the bushing 25 within the cylinder 10. Longitudinally disposed within the wall of the cylinder 10 there is a port 31 opening into the recesses 28 and 29 through radially disposed orifices 32 and 33 and leading to an annular recess 34, through a passage 35. The rifled bar is provided with a centrally disposed differential bore 36 allowing the passage of a water tube 37 to supply water to the hole being drilled. For a portion of its length, the bore 36 is enlarged to provide an adequate clearance 38 the purpose of which will be explained later. The clearance 38 in constant communication with the annular recess 34 through a plurality of radially disposed apertures 39 and longitudinally disposed grooves 40 and also in constant communication with the external wall of the rifle bar through a plurality of radially disposed orifices 41 opening toward the forward end thereof. Leading from the valve chamber 9 into the longitudinally disposed port 31, there is a restricted passage 42 of smaller cross sectional area than the passage 35.

In the operation of the device, assuming the throttle valve 22 to be positioned as illustrated in Fig. 1, motive fluid will be admitted through passages 23 and 24 into the valve chamber 9 to operate the valve and in turn impart a consequential reciprocation of the piston 11. From the chamber 9, motive fluid will flow into the port 31 through the restricted passage 42 and into the lubricant reservoir through the radially disposed orifices 32 and 33, grooves 28 and 29 and upper openings 30, to create pressure upon the lubricant within the reservoir 26. When the throttle valve 22 is turned to the off position motive fluid will be prevented to enter the valve chamber 9 and the pressure fluid within the reservoir 26 creating a certain pressure upon the lubricant will forcibly eject the same therefrom through the lower opening 30 and grooves 28 and 29, orifices 32 and 33 into the port 31. Simultaneously a certain amount of pressure fluid will escape through the upper openings 30 and into the port 31 in a same manner. The lubricant within said port will be conveyed by said pressure fluid through port 35 into the annular recess 34 and through the longitudinally disposed grooves 40, ports 39, clearance 38 and finally through the radially disposed orifices 41 to the external wall of the rifled stem 20. A restricted amount of lubricant will be conveyed into the valve chamber 9 through the port 42. When the throttle valve is again turned into an open position, the pressure fluid within the chamber 9 will carry the lubricant upon the valve mechanism. During the reciprocation of the piston 11 the lubricant fed to the outer wall of the rifled stem 20 will be carried by the piston upon the full length of the stem thus affording an efficient and simple lubrication mechanism. When the machine is again in operation, pressure fluid will be re-admitted into the reservoir 26 as previously described.

Attention is directed to the position of the openings 30. When the bushing 25 is pressed into the cylinder 10, said openings are located in the upper and lower part of the cylinder, thus allowing the upper ones to be uncovered by the lubricant. If the pressure fluid when exhausting from the reservoir 26 had to force its way through the lubricant without any alternative, a great amount of lubricant would be forced out of the reservoir and consequently result into a superfluous lubrication.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope and spirit of the invention as herein claimed.

I claim:

1. In a lubricating device for rock drill the combination of a cylinder, a piston reciprocable therein and capable of rotation, of means for effecting such rotation including a rifle bar with which the piston slidably engages, a passage within said rifle bar through which a tube passes for admitting cleansing fluid to the hole being drilled, of a lubricant reservoir within said rock drill, and means including said passage for conveying lubricant from said reservoir upon the engaging surface of said rifle bar with said piston.

2. In a lubricating device for rock drill the combination of a cylinder, a piston reciprocable therein and capable of rotation, of means for effecting such rotation including a rifle bar with which the piston slidably engages, a passage within said rifle bar through which a tube passes for admitting cleansing fluid to the hole being drilled, a clearance between said tube and the inner wall of said passage, of a lubricant reservoir within said rock drill, passages leading from said reservoir to said clearance for admitting lubricant therein, and restricted apertures leading from said clearance to the engaging wall of said rifle bar with said hammer for admitting lubricant to said surface.

3. In a lubricating device for rock drill the combination of a cylinder, a piston reciprocable therein and capable of rotation, of means for effecting such rotation including a rifle bar with which the piston slidably engages, a passage within said rifle bar through which a tube passes for admitting cleansing fluid to the hole being drilled, a clearance between said tube and the inner wall of said passage, of a lubricant reservoir within said rock drill, orifices affording the constant communication of said reservoir with said clearance for admitting lubricant from the former into the latter, and restricted openings leading from said clearance to the engaging surface of said rifle bar with said piston for admitting lubricant thereto.

4. In a lubricating device for rock drill the combination of a cylinder and a piston reciprocable therein and capable of rotation, of means for effecting such rotation including a rifle bar with which the piston slidably engages, a passage within said rifle bar through which a tube passes for admitting cleansing fluid to the hole being drilled, said passage being formed of an enlarged and restricted portion, of a lubricant reservoir within said rock drill, orifices affording communication between said reservoir and the enlarged portion of said passage for admitting lubricant therein, said tube engaging with the inner wall of the restricted portion of said passage for intercepting said lubricant, and restricted orifices opening into the enlarged portion of said passage for conveying lubricant to the engaging surface of said rifle bar with said piston.

JOHN C. CURTIS.